Jan. 3, 1967     S. G. NEVIUS     3,295,368
ELECTRICAL LOAD CELL
Filed July 13, 1964
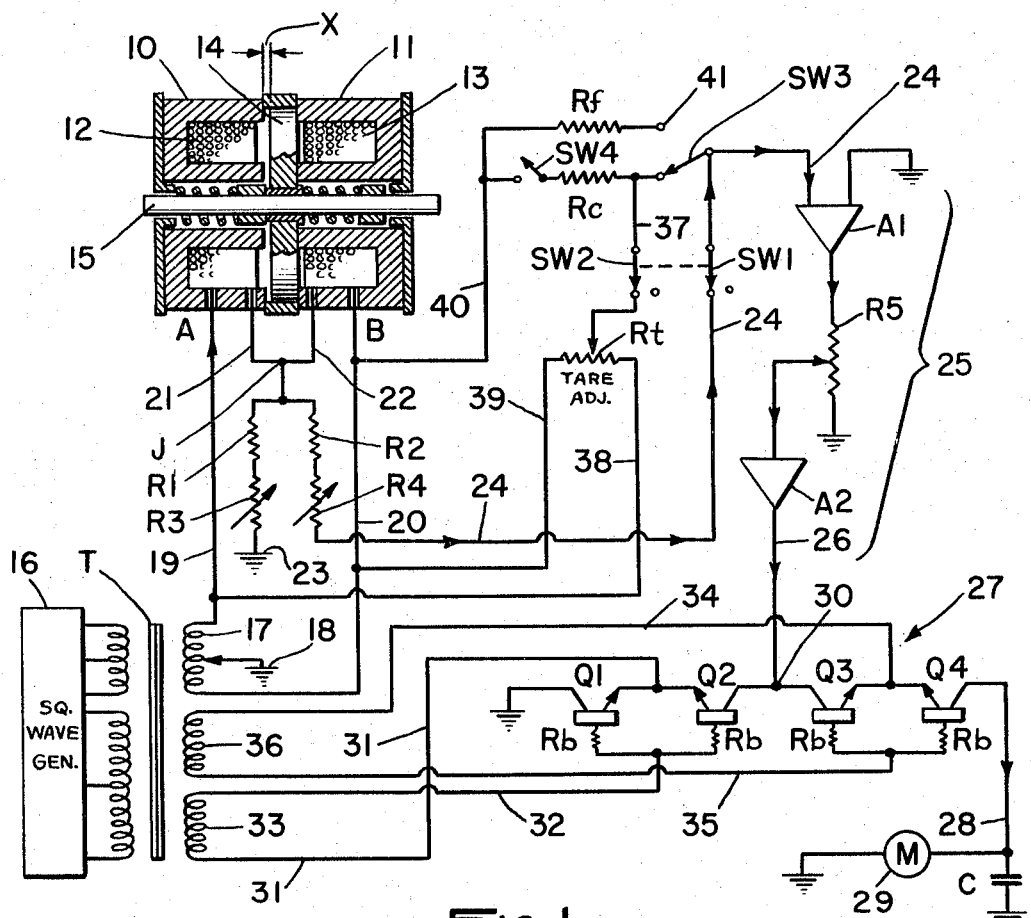
FIG.1.
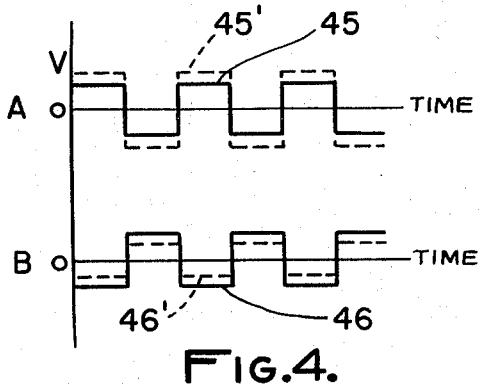
FIG.4.
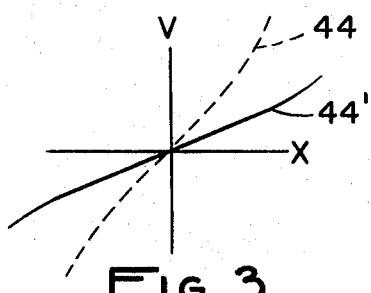
FIG.2.
FIG.3.
INVENTOR.
SEARLE G. NEVIUS
BY
*Elliott & Pastoriza*
ATTORNEYS United States Patent Office 3,295,368
Patented Jan. 3, 1967

3,295,368
ELECTRICAL LOAD CELL
Searle G. Nevius, Playa Del Rey, Calif., assignor to W. C. Dillon & Company, Inc., a corporation of Illinois
Filed July 13, 1964, Ser. No. 382,037
11 Claims. (Cl. 73—141)

This invention relates generally to load cells and more particularly to an improved electrical type load cell in which flexing of a member in the cell by a tension or a compression force is converted into an electrical signal proportional to the tension or compression force for operating a meter or equivalent readout means.

Load cells for transducing mechanical movement into electrical signals are well known in the art. Usually these cells incorporate transformer windings, the coupling therebetween being varied in response to mechanical movement resulting from loading of the cell. The output signal is then suitably amplified and indicated by a meter.

Heretofore such cells have been excited by a sine wave generator. When a change in the output signal occurs as a consequence of a tension or compression force on the cell, such change is detected by measuring the change in amplitude of the sine wave signal. The use of sine waves, however, has been found to result in certain difficulties in the electrical portion of the indicating equipment. More particularly, should a 60 cycle signal be used, spurious signals may also be sensed in the readout equipment from normal 110 volt 60 cycle power supplies for environmental equipment. Moreover, it is difficult to use a sine wave signal for gating purposes in attempts to eliminate such spurious signals without introducing additional circuitry to modify the shape of the sine wave.

Another problem encountered generally with electrical load cells resides in the difficulty of providing an electrical output signal which is substantially absolutely linear with respect to movement of a mechanical element in response to a force applied to the load cell. Non-linearities are introduced not only as a consequence of the characteristics of transformer coils themselves, such as eddy currents and core losses, but also as a consequence of temperature variations, inhomogeneities in the flexing diaphragm portion of the load cell wherein there is not a linear relationship between the force applied and the degree of flexing of the diaphragm, and other related physical factors.

Finally, most electrical type load cells as have been provided heretofore, require a specific type of readout equipment matched to the particular load cell. In other words, for a given load cell construction, there is provided an electrical output signal which will only function to operate a particular type of readout means designed to be responsive to such signal. Thus, when other electrical cells are employed which might be the case wherein a cell of widely different capacity is used, a special readout circuitry is required for that cell. It would be desirable to provide an electrical load cell in which the output signal indicating the loading on the cell may be adjusted in value to accommodate the same readout equipment with only scale reading differences to correspond to the particular load cell being employed. For example, in the case of a sensitive load cell as might be used to measure forces varying from 1 to 100 pounds, the output circuitry for detecting the electrical signal generated by such a load cell would be different and not suitable for indicating a signal received from a different type of load cell capable of measuring forces, for example, between 1000 and 6000 pounds. If the output electrical circuitry for detecting a signal could be designed so that a given signal range would be provided for a single readout means and this given signal could be maintained within the given range by simple adjustment for any of several different types of load cells as might be used, then a great advantage would be realized over presently available load cell devices.

Other considerations in the provision of an improved electrical type load cell relate to suitable means for introducing tare weight signals, simple calibrating means, and suitable means for enabling a qualitative check on the accuracy of the instrument after prolonged use which means does not unduly complicate the electrical circuitry.

With all of the foregoing considerations in mind, it is accordingly a primary object of this invention to provide an improved electrical load cell incorporating novel circuitry overcoming the afore-mentioned problems and incorporating suitable desirable features as recited above.

More particularly, it is an object to provide an improved load cell in which the exciting signal is of a character and frequency as to avoid spurious environmental signals from appearing in the readout of the device.

Another object is to provide an improved electrical load cell providing an output signal which is substantially absolutely linear with respect to the applied force to the load cell, this linearity being a substantial improvement over that realized in most prior art cells.

Another important object is to provide an improved electrical load cell incorporating a unique circuit feature which substantially completely eliminates any spurious signals to the end that greater accuracy is achieved.

Still another object is to provide an improved electrical load cell meeting the foregoing objects which also includes a simple tare weight adjust, simple calibrating resistance means, and novel means for enabling a qualitative check on the accuracy of the instrument after prolonged use.

A particular object of this invention is to provide an improved electrical load cell in which the output signal may be suitably adjusted so that a single readout circuitry means may be used with load cells of widely different capacities to the end that a modular feature is provided resulting in increased economy and greater efficiency in the making of a number of load cell measurements.

Briefly, these and many other objects and advantages of this invention are attained by providing an electrical load cell incorporating first and second inductance type windings as opposed to transformer windings. An armature is positioned in flux coupling relationship with the windings and is responsive to a force exerted on the load cell to move from a substantially centered position relative to the inductance windings to an off-center position. The windings are excited by a square wave generator for providing a symmetrical square wave with respect to ground. This generator is connected between one end of each of the windings, the other ends of the windings being connected together to a common junction point so that the windings are excited by square waves 180 degrees out of phase with each other. By this arrangement, when the armature is in a center position, no voltage appears at the common junction point of the inductance windings. On the other hand, when the armature is moved to an off-center position, there will result a change in flux in the inductance windings to provide a voltage signal at this junction point. This voltage signal, however, does not have the high degree of linearity with respect to the force applied to the cell as would be desired.

In accordance with further features of this invention, there is therefore provided a novel resistance network connected between the junction point and ground and also connected to a suitable current sensing means. By carefully selecting the value of the total resistance of the resistance network, the windings may be loaded in such a manner as to result in a current signal from the resistance network which is substantially absolutely linear with respect to the given force applied to the load cell over a desired range. Further, this resistance network includes means for varying this current without changing the overall resistance of the network so that the linearity will be retained and yet the sensivity of the device by changing the magnitude of the signal current in response to a given force is variable to provide the aforementioned modular feature so that the same readout indicating equipment may be used with different cells.

In accordance with a further most important feature of this invention, a demodulating switching means is connected between the current sensing means and a suitable readout means and is synchronized with the square wave generator to provide a rectified output signal of magnitude proportional to the current passed to the current sensing means from the resistance network. By using such a demodulating switching means which is synchronized with the square wave generator, only the desired signal can be passed by the demodulating network to the readout with the consequence that any spuriously generated signals are substantially completely eliminated.

Suitable tare weight adjustments, calibration adjustments, and qualitative checks on the accuracy of the instrument can be effected through the provision of simple resistances connected between the square wave generator and the current sensing means, there being provided suitable switches so that these resistances may be switched in to provide currents of given magnitude corresponding to currents as would be provided by the load cell resistance network.

A better understanding of the invention will be had by now referring to one embodiment thereof as illustrated in the accompanying drawings, in which:

FIGURE 1 is a schematic view partly in block diagram form illustrating the improved electrical load cell and electrical circuitry therefor in accordance with this invention;

FIGURE 2 illustrates qualitatively various curves indicating characteristics of the load cell under certain conditions useful in explaining certain advantages and features of the circuit of FIGURE 1;

FIGURE 3 is another plot of one of the certain characteristics shown in FIGURE 2; and, FIGURE 4 illustrates the exciting wave forms employed in the circuit of FIGURE 1.

Referring to the upper left-hand corner of FIGURE 1, there is schematically depicted a load cell including opposed cup-cores 10 and 11 within which first and second inductance windings 12 and 13 are formed in axially spaced opposed relationship. Positioned symmetrically or substantially in a center position between the inductance windings 12 and 13 is an armature 14 coupled for movement with a central shaft 15 passing axially through the coils as shown. Movement of the shaft 15 will move the armature 14 to vary the relative air gaps between the armature 14 and the inductance windings 12 and 13. The air gap, for example, between the armature 14 and inductance winding 13 is indicated at X.

The cup cores and windings as well as the armature and shaft, are incorporated in a load cell casing, one wall of which is adapted to function as a diaphragm and flex under a load. This wall portion is secured to the shaft 15 so that loading of the load cell results in movement of the shaft 15 and thus the armature 14. The physical construction of the casing and coupling of the diaphragm wall to the shaft 15 is fully set forth and described in applicant's co-pending application entitled Load Cell, filed July 13, 1964, and assigned Serial No. 382,036. The only portion of the physical construction of the load cell as described in the afore-mentioned co-pending application which is of significance in the instant case, resides in the fact that the armature 14 and shaft 15 move in response to a force in such a manner as to vary the air gap X.

The inductance windings 12 and 13 are excited by a square wave generator or oscillator shown in the lower left-hand corner of FIGURE 1 and designated 16. This square wave generator preferably constitutes a transistor type switching circuit incorporating a saturable core transformer T such as shown and described in United States Patent No. 3,070,759. A secondary winding 17 for the transformer T is center-tapped to ground as indicated at 18. The outer ends of this secondary winding connect through leads 19 and 20 to one end of each of the inductance windings 12 and 13. The other ends of the inductance windings are indicated at 21 and 22 and connect together at a common junction point J.

From the symmetry of the circuit described thus far, it will be clear that the inductance windings 12 and 13 will be excited by square waves which are 180 degrees out of phase with each other so that when the actual electrical inductance of each of the windings is equal, there will be zero voltage at the junction point J. On the other hand, if the armature 14 is moved closer to one and further away from the other of the inductance windings, the flux in the windings will become unbalanced resulting in a voltage appearing at the junction point J.

Between the junction point J and ground 23 there is provided a resistance network including fixed resistances R1 and R2 and variable resistances R3 and R4. The fixed resistance R1 and variable resistance R3 provide a series path between the junction point J and ground 23 and constitute a first resistance means. The fixed resistance R2 and variable resistance R4 connect from the junction point J through a lead 24 and switch SW1 into a current sensing means designated generally by the bracket 25, shown in the right-hand portion of the drawing. The resistance network constitutes an important feature of this invention and essentially enables the magnitude of current in the signal line 24 to the current sensing means 25 to be adjusted without changing the overall total resistance between the junction point J and ground. This overall total resistance is fixed at a value which will provide the desired degree of linearity of the current signal in the line 24, all as will become clearer when the operation of the cell is described.

As shown in the right-hand portion of the drawing, the current sensing means 25 includes a first amplifier A1 constituting a current sensing amplifier characterized by having a substantially zero input impedance. Thus, for practical purposes, the lead 24 is substantially at ground potential. It is important that the input impedance of the amplifier A1 be as small as possible in order that the value of the current in the signal line 24 will not be affected by the presence of the amplifier A1. Such low input impedance amplifiers are well known in the art and therefore a detailed description thereof is not deemed necessary.

The output from the amplifier A1 connects through a high resistance R5 to ground. The output of the amplifier A1 is of high impedance and therefore a voltage signal may be selected from the resistance R5 which is directly proportional to the current signal fed into the amplifier A1. This voltage signal passes to the input of a second amplifier A2 which may be a conventional high gain amplifier to provide an amplified signal on an output line 26.

The signal on line 26 is fed into a demodulating switching means designated generally by the numeral 27. From the demodulating switching means 27, a rectified output signal is provided on line 28 extending from the extreme right of the demodulating circuit to a readout means in the form of a meter 29. A condenser C is connected between the lead 28 and ground and serves simply as a storage condenser to smooth the rectified output signal.

With reference now to the demodulating switching means 27, this circuit receives the output signal on line 26 at a junction point 30. The circuit itself includes first and second pairs of switching transistors Q1, Q2 and Q3, Q4. The emitter terminals of the transistors Q1 and Q2 constituting the first pair connect together to a common lead 31. The base terminals of the transistors Q1 and Q2 in the first pair are connected together through base resistances $R_b$ to a common lead 32. The leads 31 and 32 connect to the outer end of a secondary coil 33 in flux coupling relationship with the transformer T of the square wave generator 16.

Similarly, the emitter terminals of the second pair of switching transistors Q3 and Q4 are connected together to a common lead 34 and the base terminals connected through base resistances $R_b$ to a common lead 35. The leads 34 and 35 connect to the outer ends of a further secondary winding 36 of the transformer T constituting part of the square wave generator circuit. The connections are such that 180° out of phase square waves are provided between the connected emitter and base terminals of the first and second pairs of transistors respectively. These square waves are in exact synchronism with the square waves passed to the inductance windings 12 and 13 in the load cell since the same are derived from the same output transformer T of the square wave generator. The effect of the square waves on the respective pairs of transistors is to render them alternately conducting and non-conducting so that an output signal to the meter 29 is only provided when the transistors Q3 and Q4 are conducting or appear as a straight connection from the junction point 30 to the lead 28.

Since the demodulating switching means is in synchronism with the square waves applied to the inductance windings, the demodulating switching circuit functions as a filter to pass only the output signal from the current sensing means 25 resulting from the exciting signals passed to the inductance windings. Accordingly, spuriously generated signals such as conventional sine wave signals of different frequencies are completely blocked by the demodulating switching means 27.

In addition to the circuitry described thus far, there is provided means for introducing an additional signal to the current sensing means 25 for tare weight adjustments. This signal is introduced to the input signal lead 24 through switch arm SW2, conductor 37, and switch arm SW3. The switch arm SW2 connects to a tap lead on a tare weight resistance potentiometer $R_t$. The opposite ends of this resistance $R_t$ in turn connect through leads 38 and 39 across the leads 19 and 20 respectively from the secondary coil 17 of the square wave generator 16. By adjusting the position of the center tap on the potentiometer resistance $R_t$, a signal of desired polarity and magnitude may be introduced onto the lead 24 and summed in the amplifier A1 with the normal signal on the lead 24 from the resistance network.

The switch arm SW3 also connects to a calibrating resistance $R_c$ in series with a switch arm SW4 which is normally open. Closing of the switch arm connects the calibration resistance to an output line 40 connecting to the square wave generator output lead 20. When the switch SW4 is closed, there will be provided a current through the precision calibrated resistance $R_c$ which corresponds to that current in the signal line 24 generated when the cell is fully loaded to provide a full scale deflection reading on the meter 29 provided that the gain of the amplifiers A1 and A2 have been properly adjusted. Thus, in initially calibrating the device, with no signal on the signal lead 24 (which results when there is no force applied to the load cell), a full scale reading may be provided on the meter 29 with the calibration resistance $R_c$ in the circuit by suitably adjusting the gain of the amplifiers A1 and A2.

Also connected to the line 40 is a reference resistance $R_f$ having its other end terminating in a switch terminal 41. By switching the switch arm SW3 to the terminal 41, the calibrating resistance $R_c$ and tare weight resistance $R_t$ are removed from the circuit and a current is provided through the reference resistance $R_f$ which will provide, for example, a reading on the meter M somewhere intermediate zero and full scale readings. The purpose for this particular portion of the circuitry will also become clearer as the description proceeds.

Referring now to FIGURE 2, there is illustrated at 42 a curve representing the change in voltage induced in a single winding with variation in the air gap X between the armature and such single winding. It will be noted that the voltage is non-linear, the rate of change of this voltage increasing rapidly in a positive X direction and changing less rapidly in a negative X direction.

By adding a second inductance winding, and removing the first, the second inductance winding being positioned on the opposite side of the armature, there will result a curve 43 which is essentially a mirror image of the curve 42. When both inductance windings are employed together and the voltage measured at the junction point J, as for example in FIGURE 1, there results a somewhat more linear characteristic curve 44. However, this curve still exhibits non-linearities as evidenced by the essential S shape.

By loading the junction point J with a resistance, the overall magnitude of the voltage is first decreased and secondly the curve itself is substantially linearized. This situation is depicted in FIGURE 3 wherein the dotted line curve 44 corresponds to the solid line curve 44 of FIGURE 2 and the solid line curve 44' represents the relationship between the voltage and air gap when the resistance loading between the junction point J and ground is provided. In fact, it is found that within the desired operating range, a specific resistance value between the junction point J and ground will provide almost a perfect linearized output signal. Accordingly, the value of the resistances R1, R2, R3, and R4 in the resistance network of FIGURE 1 may be adjusted to provide an overall resistance between the junction point and ground which corresponds to this desired optimum resistance value yielding maximum linearization.

FIGURE 4 illustrates square waves generated by the square wave generator 16 and passed to the inductance windings 12 and 13. In the graph A there is illustrated a solid wave form 45 which is fed to one winding such as the inductance winding 12 of FIGURE 1. This wave form appears on the lead 19 from the square wave generator 16. In the lower graph B there is shown in solid lines a second wave form 46 180 degrees out of phase with the wave form 45. This latter wave form is fed to one end of the inductance winding 13 through the lead 20.

With the armature member 14 of FIGURE 1 centered, the net voltage appearing at the junction point J represents the sum of the two wave forms A and B and is thus zero in view of the 180 degree out of phase relationship. If the armature 14 is now moved closer to the inductance winding 12 for example, the increase in flux generated in this coil will effectively provide an increased voltage at the junction point J as represented by the dotted line square wave 45'. Simultaneously, because of the movement of the armature 14 away from the second inductance winding 13, there will result a lesser voltage contribution by the winding 13 at the junction point J as indicated by the dotted wave form 46'. The signal at J therefore constitutes a function of the movement of the armature 14. As stated heretofore, this functional relationship is not necessarily linear but may be rendered substantially linear by means of the resistance network connected between the junction point J and ground.

With the foregoing descriptions in mind, the overall operation of the electrical load cell of this invention will now be described.

The load cell inductance windings 12 and 13 are initially excited from the square wave generator by square waves out of phase as described. Preferably, a frequency of 1000 cycles is employed. This frequency is preferable since it is distinct from conventional 60 cycle frequency signals which may be radiated from environmental equipment.

When a force is exerted on the load cell resulting in movement of the armature 14, there will be established a voltage at the junction J as described. Assume that the armature 14 is moved closer to the inductance winding 12 so that it moves away from the inductance winding 13. Such movement would take place in response to a compression force if the load cell diaphragm were secured to the right-hand end of the shaft 15. Since the resistance network consisting of the resistances R1, R2, R3, and R4 has been set to provide an overall constant resistance between the junction point J and ground of a value providing optimum linearity, a current will be provided on the signal lead 24 from the second resistance means R2 and R4.

The current in the signal lead 24 for a given force exerted on the load cell may be adjusted to a desirable value. This adjustment of sensitivity of the overall unit is achieved by varying the resistance R4. Simultaneously, it is necessary to vary the resistance R3 in order that the total resistance between the junction point J and ground 23 remain constant in order to maintain the desired linearity. As an example, if it is desired to increase the current on the signal lead 24, the resistance R4 would be decreased and simultaneously the resistance R3 would be increased, these resistance variations being by different amounts so as to maintain the overall resistance constant. Similarly, if it were desired to decrease the signal current in line 24, the resistance R4 would be increased and the resistance R3 would be decreased. Once the desired signal current has been provided on line 24 in response to a given force on the load cell, which current sensitivity adjustment is made at the time that the load cell is being calibrated for use by a customer, the variable resistances R3 and R4 are locked in position.

The current signal on the line 24 is passed to the input of the current sensing means in the form of the zero input impedance amplifier A1 and thence through the amplifier A2 to the demodulating switching means 27. Assume that the initial wave form appearing at the junction point 30 of the demodulating switching means 27 is depicted by the net positive wave form in FIGURE 4 as indicated by the dotted lines. In other words, assume that the net voltage at the point 30 is of positive polarity when a compression force is exerted on the load cell to move the armature 14 closer to the inductance winding 12. At this initial point in time, square waves in exact synchronism with the square waves A and B shown in FIGURE 4 are passed to the respective pairs of transistors forming the demodulating switching means 27.

The wave from the secondary coil 33 passed through the leads 31 and 32 appears between the emitter and base terminals and serves essentially to prevent conduction of the transistors Q1 and Q2. The opposite phase square wave is simultaneously applied to the emitter and base terminals of Q3 and Q4 rendering these transistors conductive so that the positive signal during this initial portion of the wave form passes from the junction 30 through the line 28 and the meter 29. When the polarity of the signals reverse, the transistors Q3 and Q4 are rendered non-conductive so that any signal on the line 26 appearing at the junction point 30 is blocked from the meter 29. The beginning of the next cycle then results in a signal passing through the transistors Q3 and Q4 to the meter 29. Accordingly, the output fed to the meter 29 constitutes essentially a rectified signal of a given polarity. This signal is smoothed by means of the storage condenser C. The meter 29, is of course, calibrated to provide a force reading corresponding to the actual force applied to the load cell.

If, rather than a compression force, a tension force is applied to the cell to move the armature 14 closer to the inductance winding 13 and further from the inductance winding 12, the signals will be exactly the same as described except each will be reversed 180 degrees so that in view of the synchronism between the demodulating switching means and the output signal from the amplifier A2, there will be only passed a rectified negative signal to the meter 29. The meter will thus indicate a negative value or value of opposite polarity corresponding to the tension force applied.

In the absence of any movement of the armature 14, the voltage appearing at the junction point J becomes substantially zero so that there is no current signal on the line 24 and no output signal is applied to the junction point 30. Accordingly, the meter 29 will not indicate any reading either positive or negative.

With respect to the foregoing, it will be appreciated that there are many different types of switching means for accomplishing the same purpose as the particular demodulating switching means described. The important feature is the provision of a means for gating the output signal from the amplifier A2 which is controlled by the square wave generator to the end that any other spurious signals are blocked and only the desired signal resulting from action of the load cell is passed to the meter 29. Since the demodulating switching means is operated at 1000 cycles or the same frequency as the square wave generator exciting the inductance windings 12 and 13, only the demodulated output signal of the 1000 cycle frequency is passed to the meter. Thus, the combination of the square wave generator and demodulator switching means in the indicating circuit constitutes an important advance in the art insofar as the elimination of spurious signals is concerned.

In calibrating the load cell as described heretofore, the calibrating resistance $R_c$ is designed to be a precision resistance of such a value that when the switch SW4 is closed and the armature 14 exactly centered so that no current signal appears on the line 24, there will be provided a current into the amplifier A1 which corresponds to that current which would result in a full scale reading of the meter M. Thus, with the switch SW4 closed and no loading on the cell, the operator may adjust the gains of the amplifiers A1 and A2 to insure that the meter 29 displays a full scale reading.

In addition, at the time a customer purchases one of the load cells and makes sure that the gains of the amplifiers are properly set by means of the calibration resistance as described, he may throw the switch SW3 to the terminal 41 to insert the reference resistance $R_f$ into the circuit. Throwing of this switch cuts out the tare weight and calibrating resistance. The resistance $R_f$ provides a current to the current sensing means 25 which corresponds to that current which would be provided in response to certain loading of the cell to provide a scale reading. The customer could then note the exact reading of the meter 29 at the time the reference resistance $R_f$ is placed in the circuit. After prolonged use of the load cell, the customer could check the accuracy of the cell by again throwing in the resistance $R_f$ without any loading on the cell and determine if the same meter reading results as was the case when the instrument was originally purchased. Thus, by means of this reference resistance a more or less qualitative indication is provided the customer immediately as to whether there is anything wrong with the cell. For example, if the reading when the reference resistance is in the circuit after prolonged use of the cell is substantially different from the original reading, the customer will know that through prolonged use inaccuracies have developed. The provision of the reference resistance therefore constitutes an added feature to the overall unit.

The tare weight adjustment resistance $R_t$ simply provides a means for adding current into the current sensing means 25 corresponding to a given pre-loading. For example, if the load cell is employed in weighing an object, the weight of the container for the object may be subtracted from the output reading by injecting a suitable amount of current from the tare weight adjustable resistance $R_t$ through the line 37 and switch SW3. The amplifier A1 as stated, is such that any number of currents injected thereinto will simply be summed.

From the foregoing description, it will be evident that the present invention has provided a greatly improved electrical load cell. Not only is the cell far more accurate as a consequence of increased linearity between the output signal and loading thereof, but in addition, the rejection of spurious signals and the like insure greater accuracy in the actual output reading than has been possible heretofore. Further, means for enabling adjustment of the signal current on the line 24 without changing the overall resistance between the junction point J and ground results in a modular feature wherein a large number of different type cells may be used with the same detecting and indicating circuitry.

What is claimed is:

1. An electrical load cell including, in combination; first and second inductance windings; armature means movable between said inductance windings in response to a force on said cell; wave generating means including means for providing a first alternating wave form of given frequency and amplitude connected to said first inductance winding, and means for providing a second alternating wave form of identical frequency and amplitude to said first alternating wave form but 180° out of phase therewith connected to said second inductance winding to excite said first and second inductance windings with out of phase waves so that an electrically neutral point in said windings exists when said armature is in a given position between said windings, and a voltage appears at said point when said armature is moved from said given position to change the inductance of said first inductance winding relative to said second inductance winding; and a resistance network connected between said neutral point and ground to electrically load said inductance windings so that the variation of current in said resistance network is more linear with respect to movement of said armature than in the absence of said resistance network.

2. An electrical load cell comprising, in combination: a pair of inductance windings; an armature substantially symmetrically disposed with respect to said windings and responsive to a force on said load cell to move to an asymmertical position with respect to said windings to thereby vary the inductance of each winding; an alternating wave generator including means for providing first and second alternating waves with respect to ground that are of equal amplitude and 180° out of phase with each other connected between one end of each of said windings, the other ends of said windings being connected together at a common junction; resistance means coupling said common junction to ground so that said windings are respectively excited with said first and second alternating waves of the same amplitude and 180° out of phase with each other; and means connected to said common junction of said windings and responsive to any voltage appearing at said junction resulting from a difference in the inductances of said windings to provide a signal proportional to the degree of movement of said armature.

3. An electrical load cell according to claim 2, in which said means connected to said common junction includes: a current sensing means, said resistance means being connected to said current sensing means for providing said signal.

4. An electrical load cell according to claim 3, including a readout means; and a demodulating switching means connected between said current sensing means and said readout means and synchronized with said wave generator to pass a rectified output signal proportional to said signal to said readout means.

5. An electrical load cell comprising, in combination: first and second inductance windings; an armature in flux coupling relationship with said windings, said armature being responsive to a force exerted on said load cell to move from a substantially centered position relative to said inductance windings in which the air gaps between each winding and said armature are substantially equal to an off-center position in which said air gaps are unequal; a square wave generator including means for providing first and second symmetrical square waves with respect to ground which are 180° out of phase with each other connected between one end of ecah of said windings, the other ends of said windings being connected together at a common junction; a resistance network coupling said common junction to ground so that said windings are respectively excited by said first and second square waves 180° out of phase with each other; a current sensing means connected to said resistance network; a readout means; and a demodulating switching means connected between said current sensing means and said readout means and synchronized with said square wave generator to provide a rectified output signal of magnitude proportional to current passed to said current sensing means from said resistance network in response to movement of said armature to an off-center position.

6. An electrical load cell according to claim 5, in which said resistance network includes a first adjustable resistance connecting said other ends of said windings at said junction to ground and a second adjustable resistance connecting said other ends of said windings to said current sensing means, whereby the current passed to said current sensing means may be adjusted by varying said first and second adjustable resistance means without changing the total resistance between said other ends of said windings and ground.

7. An electrical load cell according to claim 6, in which said current sensing means includes a first amplifier having substantially a zero input impedance and a high output impedance connected in series with said second adjustable resistance; and a second amplifier connected between the output of said first amplifier and said demodulating switching means.

8. An electrical load cell according to claim 5, in which said demodulating switching means includes first and second pairs of switching transistors, the emitter terminals of said first pair being connected together to a first common lead, the bases of said first pair being connected together to a second common lead; the collector terminal of one of the transistors in said first pair being grounded and the collector terminal of the other of the transistors in said first pair being connected to the output of said current sensing means; the emitter terminals of said second pair being connected together to a third common lead, the bases of said second pair being connected together to a fourth common lead; the collector terminal of one of the transistors in said second pair being connected to said readout means and the collector terminal of the other of the transistors in said second pair being connected to said output of said current sensing means; means for applying a first square wave from said square wave generator to said first and second common leads and for applying a second square wave 180° out of phase with said first square wave to said third and fourth common leads, said square waves being synchronous with the square waves for exciting said coils whereby said first and second pairs of transistors are rendered alternately conducting and non-conducting to provide said rectified output signal to said readout means.

9. An electrical load cell according to claim 5, including a tare weight control means connected to said square wave generator for adding a control signal of desired magnitude to the input of said current sensing means.

10. An electrical load cell according to claim 5, including: a precision calibrating resistance; and switch means for connecting said calibrating resistance between the input of said current sensing means and the output of said square wave generator, said calibrating resistance providing a current to said current sensing means corresponding to the current from said resistance network to said current sensing means under a full scale load condition on said load cell.

11. An electrical load cell according to claim 5, including: a reference resistance; and switch means for connecting said reference resistance between the input of said current sensing means and the output of said square wave generator, said reference resistance providing a current to said current sensing means corresponding to the current from said resistance network to said current sensing means when said cell is under a load intermediate zero and a full scale load condition whereby a reading from said reference resistance may be compared with a subsequent reading with said reference resistance after prolonged use of said load cell to determine any major variations in the accuracy of said load cell.

References Cited by the Examiner

UNITED STATES PATENTS 2,643,869  6/1953  Clark _____ 73—71.2 X

FOREIGN PATENTS 704,163  2/1954  Great Britain.

RICHARD C. QUEISSER, *Primary Examiner.*

C. A. RUEHL, *Assistant Examiner.*